Sept. 27, 1966  B. L. JOHNSON ETAL  3,275,335
HIGH PRESSURE SEAL
Filed March 18, 1963

INVENTORS
BILLIE L. JOHNSON
JAMES A. BOYD
BY
Merchant, Merchant & Gould
ATTORNEYS

United States Patent Office

3,275,335
Patented Sept. 27, 1966

3,275,335
HIGH PRESSURE SEAL
Billie L. Johnson, Canoga Park, and James A. Boyd, Brea, Calif., assignors to Donaldson Company, Inc., Minneapolis, Minn., a corporation of Delaware
Filed Mar. 18, 1963, Ser. No. 265,884
1 Claim. (Cl. 277—180)

This invention relates generally to annular fluid seals, and more particularly to such seals utilized to seal the connection between cooperating members to prevent passage of liquids and gases inwardly or outwardly between said members.

More specifically, our invention relates to static seals, that is, seals which are used primarily to seal the joint between a pair of cooperating members that are fixed relative to each other.

In the fluid sealing of connections between cooperating members or devices wherein pressure differential of a high degree is encountered, and wherein pressure differential varies to a considerable extent, such as in aircraft, missile, and space vehicle fluid systems, sealing rings of rubber, plastics and the like have heretofore been ineffective, particularly under extreme variations in temperature. Different metallic seals have been used, most of these being effective under some operating conditions and ineffective under others, those having sufficient resilience to seal at various temperatures being inadequate for complete sealing under extreme pressure differentials.

The primary object of our invention is the provision of a metallic seal which has sufficient strength to seal against high pressure differential, such as in the neighborhood of 1000 lbs. per sq. inch or more, and which at the same time has sufficient resilience to provide an effective seal under extreme temperature changes and mechanical stress conditions in the members between which the seal is interposed. To this end, we provide an annular sealing ring having high strength and rigidity against stresses applied in directions radially thereof, and sufficient resiliency in a direction axially thereof to be relatively easily compressed and expanded in axial directions within the elastic limits of the ring material.

Another object of our invention is the provision of a sealing ring as set forth, comprising a generally cylindrical portion, a pair of annular end flanges projecting radially in a common direction from the opposite ends of said cylindrical portion and having annular sealing lips on the axially outer surfaces thereof for sealing engagement with members to which sealing contact is to be made, and an annular flange disposed centrally between the end flanges and generally parallel thereto, whereby to reinforce said cylindrical portion against radially inward or outward flexing between said end flanges.

Another object of our invention is the provision of a seal as set forth, in which said annular lips are disposed radially remote from said cylindrical portion and which are of such radial thickness at the axially outer sealing faces thereof to be deformed under initial sealing pressure against cooperating members to be sealed, whereby to fill minute irregularities in the areas of contact between said annular lips and said members.

Yet another object of our invention is the provision of an annular seal as described, wherein the axially outer surfaces of said end flanges are normally at right angles to the axis of the seal, and in which said annular sealing lips project axially outwardly from said surfaces, whereby, when said seal is disposed in sealing contact with a pair of cooperating members to be sealed, said end flanges are deflected axially inwardly toward each other remote from said cylindrical portion to pre-load the seal, said annular lips providing a primary seal between said members, the opposite ends of said cylindrical portion engaging said members to provide a secondary seal therebetween.

The above, and still further highly important objects and advantages of our invention will become apparent from the following detailed specification, appended claims and attached drawings.

Referring to the drawings, which illustrate the invention, and in which like reference characters indicate like parts throughout the several views.

Figure 1:
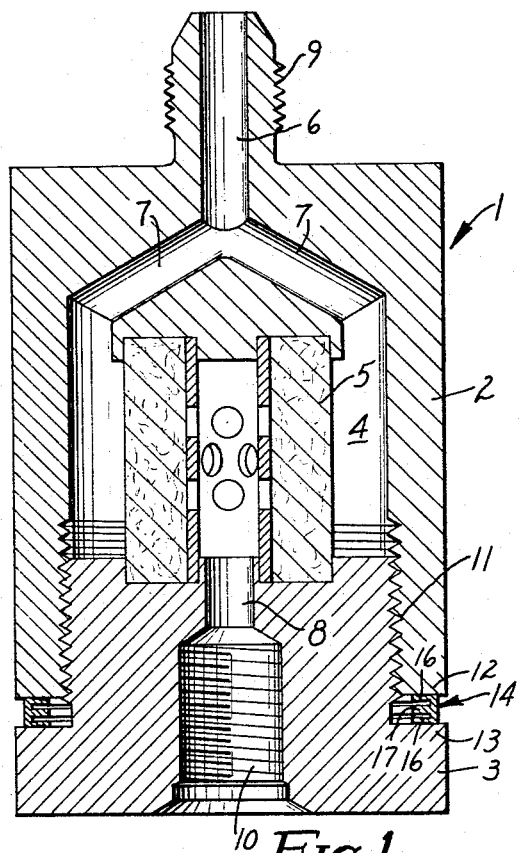
FIG. 1 is a view in axial section of a pair of cooperating fluid coupling sections illustrating the use of the high pressure seal of our invention.
Figure 2:
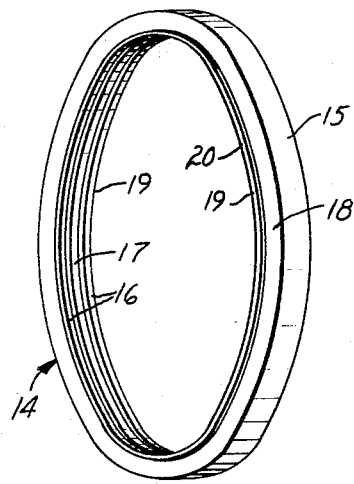
FIG. 2 is a view in perspective of the seal of FIG. 1.

Referring with greater detail to the drawings, the numeral 1 indicates, in its entirety, a fluid filter comprising a cooperating pair of housing members 2 and 3 which cooperate to define an internal chamber 4 in which is mounted a filter element or the like 5. The housing member 1 is formed to provide an inlet passage 6 and branch passages which lead to the chamber 4, and the member 3 is formed to provide an outlet passage 8 communicating with the chamber 4 through the filter element 5. Both of the housing members 2 and 3 are screw threaded as at 9 and 10 respectively for connection to suitable conduit means or other members, not shown.

Figure 3:
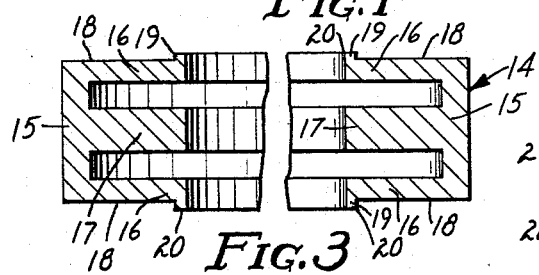
FIG. 3 is an enlarged in axial section of the seal of FIGS. 1 and 2, some parts being broken away, the seal being shown in a normal state.

The housing members 2 and 3 are screw threaded together, an indicated at 11, and are formed to provide opposed annular shoulders 12 and 13 that are preferably machined or ground to provide flat smooth opposing surfaces for reception therebetween of the annular seal of our invention. The seal, in its form illustrated in FIGS. 1-5 is indicated in its entirety by the numeral 14, and comprises an axially extending cylindrical portion 15, a pair of annular end flanges 16 and an annular reinforcing flange 17. The seal 14, while the same may be made from suitable high strength plastic, ceramics or other suitable material is preferably made from metals or alloys thereof having high tensile strength. In the normal state of the annular sealing ring 14, the end flanges 16 which project radially inwardly from the opposite ends of the cylindrical portion 15, have their outer surfaces 18 disposed normal to the axis of the seal, as shown in FIG. 3. The reinforcing flange 17 also projects radially inwardly from the cylindrical portion 15 in axially spaced parallel relation to the end flanges 16.

The end flanges 16 are of substantially uniform axial thickness throughout the radial dimensions thereof, and at their radially inner marginal edges are provided with axially outwardly projecting annular sealing lips 19 which define annular axial sealing faces 20. The radial width of the sealing faces 20 is very narrow, preferably in the order of .005 inch. This width is exaggerated in the drawings for illustrative purposes. This relatively small dimension provides for an area of contact between the sealing faces 20 and the opposed faces of their respective shoulders 12 and 13 that, when the housing members 2 and 3 are properly assembled, some deformation of the sealing faces 20 will take place to fill any minute irregularity in the opposed faces of the shoulders 12 and 13.

Figure 4:
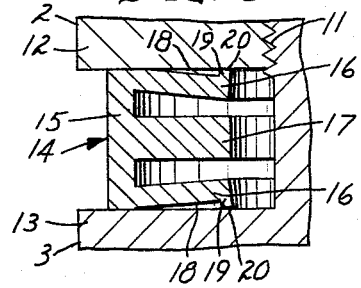
FIG. 4 is a view corresponding to a portion of FIG. 1, on an enlarged scale, and showing the seal in a pre-loaded operative condition.

As shown in FIG. 4, when the housing members 2 and 3 are properly screwed together, the opposing faces of the shoulders 12 and 13 engage the opposite ends of the cylindrical portion 15 of the annular seal 14 to provide a secondary seal and to limit relative movement between the shoulders 12 and 13 toward each other. During final movement of the shoulders 12 and 13 toward each other, engagement of the opposing faces thereof with their adjacent annular sealing faces 20 of the lips 19 causes the end flanges 16 to be deflected axially inwardly toward each other. It should be here noted that the axial distance between each flange surface 18 and its respective annular sealing face 20 is such that, when the faces of the shoulders 12 and 13 engage the opposite ends of the cylindrical seal portion 15, the extent of deflection of the end flanges 16 is well within the elastic limits of the seal material. Hence, the end flanges 16 do not take a "set" but tend to return to their normal positions of FIG. 3 should separation of the shoulders 12 and 13 occur. It will be further noted that the spaces between the central reinforcing flange 17 and the end flanges 16 are each greater than the axial distance between the outer surfaces 18 and the annular sealing faces 20, whereby to permit the above-mentioned deflection of the end flanges 16.

As shown, the axial thickness of the reinforcing flange 17 is considerably greater than the nominal thickness of each of the end flanges 16, the flange 17 acting primarily as a mass energy section. The annular seal 14 being integrally formed, the central flange 17, due to is mass, effectively holds the cylindrical portion 15 in its cylindrical shape under extreme pressure, preventing the cylindrical portion 15 from bulging outwardly intermediate the ends thereof under extreme fluid pressure within the seal. By so reinforcing the cylindrical portion 15 intermediate its ends, high internal pressure is prevented from deflecting the end flanges 16 axially inwardly to cause a break in the primary seal.

Use of the seal 14, as illustrated in FIGS. 1 and 4, eliminates the necessity for extreme tolerances in the screw thread connection 11 and reliance on an extremely close fit in the thread connection for sealing between the housing members 2 and 3. It will be further appreciated that other annular seals, not shown, but similar to the seal 14, and of lesser diameter, may be used at opposite ends of the housing 1 to seal connections thereto.

Figure 5:
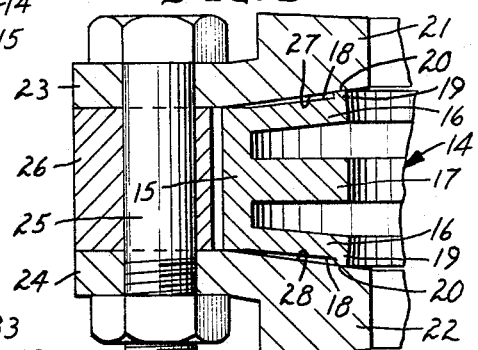
FIG. 5 is a view corresponding to FIG. 4 but showing a modified mounting arrangement and showing the seal in an expanded state under extreme pressure conditions.

In the arrangement illustrated in FIG. 5, the seal 14 is shown as being interposed between a pair of cooperating pressurized members 21 and 22 having circumferential flanges 23 and 24 respectively, and held in predetermined spaced relationship by a plurality of nut-equipped bolts or the like 25, one of which is shown. The members 21 and 22 may be assumed to be portions of a housing such as the housing 1 and to correspond with the housing members 2 and 3 respectively. The flanges 23 and 24 are reinforced by spacer elements 26, one of which is shown, the spacer elements 26 having an axial length equal to, or slightly less than the axial length of the cylindrical portion 14 of the annular seal 14. In FIG. 5, the members 21 and 22 are illustrated, in an exaggerated manner, in a spread apart condition caused by extreme internal pressure. Herein is also illustrated the manner in which the end flanges 16 of the annular seal 14 are deflected axially outwardly by the internal pressure, so that the primary seal between the annular sealing faces 20 and the adjacent sealing faces 27 and 28 of the members 21 and 22 respectively is maintained.

Figure 6:
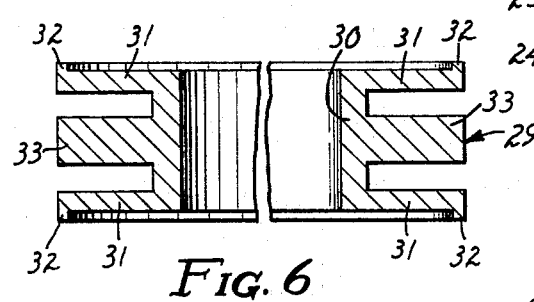
FIG. 6 is a view corresponding to FIG. 3 but showing a modified form of our pressure seal.

The modified form of annular seal shown in FIG. 6 is indicated in its entirety by the reference numeral 29, and is intended to seal the interior of a coupling or the like against high external pressures. The annular seal 29 comprises a cylindrical portion 30 having end flanges 31 which project radially outwardly from opposite ends of the cylindrical portion 30, the end flanges 31 being formed at their outer margins with axially outwardly projecting annular sealing lips 32. A central annular flange 33 projects radially outwardly from the intermediate portion of the cylindrical portion 30 in spaced parallel relation to the end flanges 31. The end flanges 31 and central flange 33 correspond to the end flanges 16 and reinforcing flange 17 respectively of the annular seal 14, the seals 14 and 29 differing only in the relative positions of the cylindrical portions and the annular sealing lips.

By means of the construction shown and above described, the seal ring of our invention can be produced in very small sizes which are capable of withstanding pressures at exceedingly high levels. Further, the annular sealing lips enable the cooperating faces of the members to be sealed to be machined flat, thus eliminating the necessity for providing grooves for the seal in order to obtain effective sealing. Further, by providing such annular seals with predetermined axial dimensions, the seals may be utilized as spacers between the members to retain the members in predetermined spaced relationship. It will be still further appreciated that the specific construction of the annular seal permits the same to be effectively used in installations that are somewhat flexible and subject to limited movement, such as through vibration while under high pressure differentials. The seal construction also lends itself to effective operation over a wide temperature range during high pressure operation.

While we have shown and described a commercial embodiment of our annular seal, and a single modification thereof, it will be understood that the same is capable of further modification without departure from the spirit and scope of the invention, as defined in the claim.

What we claim is:

A one-piece annular pressure seal of hard resilient material adapted to be interposed between opposed flat annular surfaces of a pair of cooperating members, said seal comprising:
  (a) an axially extending cylindrical portion having a predetermined axial dimension,
  (b) a pair of annular end flanges of predetermined axial thickness projecting radially in a common direction from opposite ends of said cylindrical portion and being parallel to each other and having axially outer surfaces normally disposed in parallel planes transversely of the axis of said cylindrical portion,
  (c) an annular reinforcing flange of substantially uniform axial thickness substantially greater than that of either end flange between radially inner and outer portions thereof disposed centrally between and in axially spaced parallel relation to said end flanges, all said flanges being of equal radial extent,
  (d) and a pair of annular sealing lips one each projecting axially outwardly from the axially outer surface of a different one of said end flanges at the radial edge portion thereof radially spaced from said cylindrical portion,
  (e) said sealing lips having axially outwardly facing flat annular sealing surfaces for sealing engagement with respective ones of the annular surfaces of said cooperating members and normally spaced apart a distance greater than the axial dimension of said cylindrical portion,
  (f) the axial spacing between said reinforcing flange and each of said end flanges being greater than the axial dimension between each annular sealing surface and the axially outer surface of its respective end flange,
  (g) the arrangement being such that, when said sealing surfaces are moved toward each other by pressure of said cooperating members thereagainst to the extent that said members bear against the ends of said cylindrical portion, deflection of said end flanges does not exceed the elastic limits of said end flanges, and said reinforcing flange and end flanges remain in axially spaced apart relationship.

References Cited by the Examiner

UNITED STATES PATENTS 3,083,023  3/1963  Creavey _____ 277—180 X

FOREIGN PATENTS 1,222,943  1/1960  France.
44,867  2/1928  Norway.

OTHER REFERENCES

Machine Design—The Seals Book, The Penton Publishing Co., January 1961, TJ 246 M3, pp. 110 and 111.

SAMUEL ROTHBERG, *Primary Examiner.*

LAVERNE D. GEIGER, *Examiner.*